(12) United States Patent
Ekambaram et al.

(10) Patent No.: US 12,487,772 B2
(45) Date of Patent: Dec. 2, 2025

(54) BOOSTED DRIVER CIRCUITRY OF A LOW VOLTAGE SUPPLY MEMORY CONTROLLER

(71) Applicant: XILINX, INC., San Jose, CA (US)

(72) Inventors: Sabarathnam Ekambaram, Secunderabad (IN); Xiaobao Wang, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 258 days.

(21) Appl. No.: 18/141,229

(22) Filed: Apr. 28, 2023

(65) Prior Publication Data
US 2024/0361948 A1 Oct. 31, 2024

(51) Int. Cl.
G11C 16/04 (2006.01)
G06F 3/06 (2006.01)
H03K 5/13 (2014.01)
H03K 17/16 (2006.01)

(52) U.S. Cl.
CPC .......... *G06F 3/0655* (2013.01); *G06F 3/0604* (2013.01); *G06F 3/0673* (2013.01); *H03K 5/13* (2013.01); *H03K 17/162* (2013.01)

(58) Field of Classification Search
CPC .... G06F 3/0655; G06F 3/0604; G06F 3/0673; H03K 5/13; H03K 17/162
See application file for complete search history.

(56) References Cited

U.S. PATENT DOCUMENTS

| 11,721,651 B2 | 8/2023 | Poon et al. | |
| 2016/0049939 A1* | 2/2016 | Martin | H05B 45/10 327/109 |
| 2017/0294223 A1* | 10/2017 | Zhang | G11C 11/412 |
| 2018/0301977 A1* | 10/2018 | Yamada | H03K 17/166 |

* cited by examiner

*Primary Examiner* — Pho M Luu
(74) *Attorney, Agent, or Firm* — Patterson + Sheridan, LLP (57) ABSTRACT

A memory controller includes driver circuitry, which includes main driver circuitry and hold driver circuitry. The main driver circuitry and hold driver circuitry are connected to an output node. The main driver circuitry comprises driver slice circuitries and outputs a first output signal to the output node based on a first input signal and a second input signal and a number of activated driver slice circuitries. The hold drive circuitry receive the first input signal and outputs a second output signal. The second output signal is delayed with reference to the first output signal by a first delay amount.

19 Claims, 6 Drawing Sheets

BOOSTED DRIVER CIRCUITRY OF A LOW VOLTAGE SUPPLY MEMORY CONTROLLER

TECHNICAL FIELD

Examples of the present disclosure generally relate to driver circuitry of a memory controller that includes boosted circuit elements that mitigates interference within an output signal.

BACKGROUND

A memory controller for a memory device includes physical layer circuitry (PHY circuitry) that drives data signals onto the memory device and receives data signals from the memory device. To drive the data signals onto the memory device, the PHY circuitry includes driver circuitry. The driver circuitry includes one or more pre-driver slices and driver slices, and a p-channel metal-oxide semiconductor (PMOS) transistor. The PMOS transistor is used for electrostatic discharge (ESD) protection. In one example, the driver slices include n-channel MOS (NMOS) transistors for pull up and pull down in a low voltage application (e.g., about 0.5 V or less). The NMOS transistors are driven with two data signals having an inverse polarity to the other. As one data signal transitions to a positive voltage, the other data signal transitions to a negative voltage. As the data signals transition between positive and negative voltages, the drive strength of the NMOS transistor becomes weaker during pull up leading to an increase in rise time of an output voltage signal driven on an output pad. Accordingly, the susceptibility of a signal on the output node to supply noise and crosstalk between data lines is increased, resulting in intersymbol interference (ISI).

SUMMARY

In one example, a driver circuitry includes main driver circuitry and hold driver circuitry. The main driver circuitry and hold driver circuitry are connected to an output node. The main driver circuitry comprises driver slice circuitries and outputs a first output signal to the output node based on a first input signal and a second input signal and a number of activated driver slice circuitries. The hold drive circuitry receive the first input signal and outputs a second output signal. The second output signal is delayed with reference to the first output signal by a first delay amount.

In one example, a memory controller includes control circuitry and interface circuitry. The control circuitry outputs a data signal. The interface circuitry is coupled to the control circuitry and receives the data signal. The interface circuitry includes driver circuitry. The driver circuitry includes main driver circuitry and hold driver circuitry. The main driver circuitry is connected to an output node. The main driver circuitry includes driver slice circuitries. The main driver circuitry outputs a first output signal to the output node based on a first input signal, a second input signal and a number of activated driver slice circuitries. The first input signal and the second input signal are generated from the data signal. The hold driver circuitry is connected to the output node. The hold driver circuitry receives the first input signal and outputs a second output signal. The second output signal is delayed with reference to the first output signal by a first delay amount. The interface circuitry is further configured to output a signal to a memory device based on the first output signal and the second output signal.

In one example, driver circuitry includes main driver circuitry, hold driver circuitry connected to an output node, delay circuitry, and boost circuitry. The main driver circuitry includes driver slice circuitries. The main driver circuitry outputs a first output signal to the output node based on a first input signal, a second input signal and a number of activated driver slice circuitries. The hold driver circuitry receives the first input signal and outputs a second output signal. The second output signal is delayed with reference to the first output signal by a first delay amount. The delay circuitry receives the first input signal and the second input signal and outputs a first delayed signal and a second delayed signal based on a second delay amount. The boost circuitry includes boosts slice circuitries. The boost circuitry outputs a third output signal based on the first delayed signal, the second delayed signal and a number of activated boost slice circuitries. The third output signal is delayed with reference to the first output signal.

BRIEF DESCRIPTION OF DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

A memory controller is used to drive a memory device. The memory controller includes physical interface (PHY) circuitry that drives data signals onto a memory device and receives data signals from the memory device. For example, the PHY circuitry includes receiver circuitry that receives the data signals from the memory device and driver circuitry that drives data signals onto the memory device.

The memory device operates at frequencies of about 10 gigabits per second (Gbps) or more. However, at such operating frequencies conventional driver circuitries introduce intersymbol interference (ISI), reducing the performance of the memory controller and memory device. Generally, conventional driver circuitry includes pre-driver slice circuitries, driver slice circuitries, and an electrostatic discharge (ESD) transistor that drive a signal onto an output pad of the memory controller. The pre-driver slice circuitries operate in a first power domain (e.g., 0.75 V), and the driver circuitries operate in a second power domain (e.g., 0.4 V). Each driver slice circuitry includes two series connected n-channel metal-oxide semiconductor (NMOS) transistors. The gate node of a first one of the transistors is driven with a first data signal, and the gate node of a second one of the transistors is driven with a second data signal. The first and second data signals are opposite in polarity. As the first data signal rises in voltage, the second data signal falls in voltage. Accordingly, the voltage of the signal at the output pad rises, which reduces the gate source voltage (Vgs) of the transistor having a gate node connected to the first data signal. Reducing the Vgs increases the rise time of the signal at the output pad. As the signal at the output pad continues to rise, the first transistor reaches a sub-threshold further slowing down the rise time of the voltage at the output pad. Further, the signal at the output pad is weakly held, and the signal is susceptible to supply circuitry noise, and crosstalk between output data lines, resulting in ISI. Additionally, as the first data signal falls in voltage, and the second data signal rises in voltage, the first data signal couples with the weakly held output pad, leading to voltage error at the output pad, negatively impacting the eye opening of the corresponding eye diagram of the driver circuitry.

In the following, driver circuitry for a memory controller circuitry having reduced ISI and voltage errors is described. The driver circuitry as described herein includes one or more driver slice circuitries, one or more boost slice circuitries, and hold driver circuitry that mitigate ISI and voltage errors of the memory controller. The one or more driver slice circuitries output a voltage signal onto an output pad. The one or more boost slice circuitries are AC coupled to the output pad and output a voltage signal to the output. The one or more boost slice circuitries drive a delayed voltage signal on to the output pad, reducing the rise time of the voltage signal driven onto the pad, mitigating ISI and voltage errors that operate at about 10 Gbps (or greater). Accordingly, memory errors within the memory device are mitigated. Further, the hold driver circuitry mitigates crosstalk interference within the channel between the memory controller circuitry and memory device, improving performance of the corresponding memory device.

Figure 1:
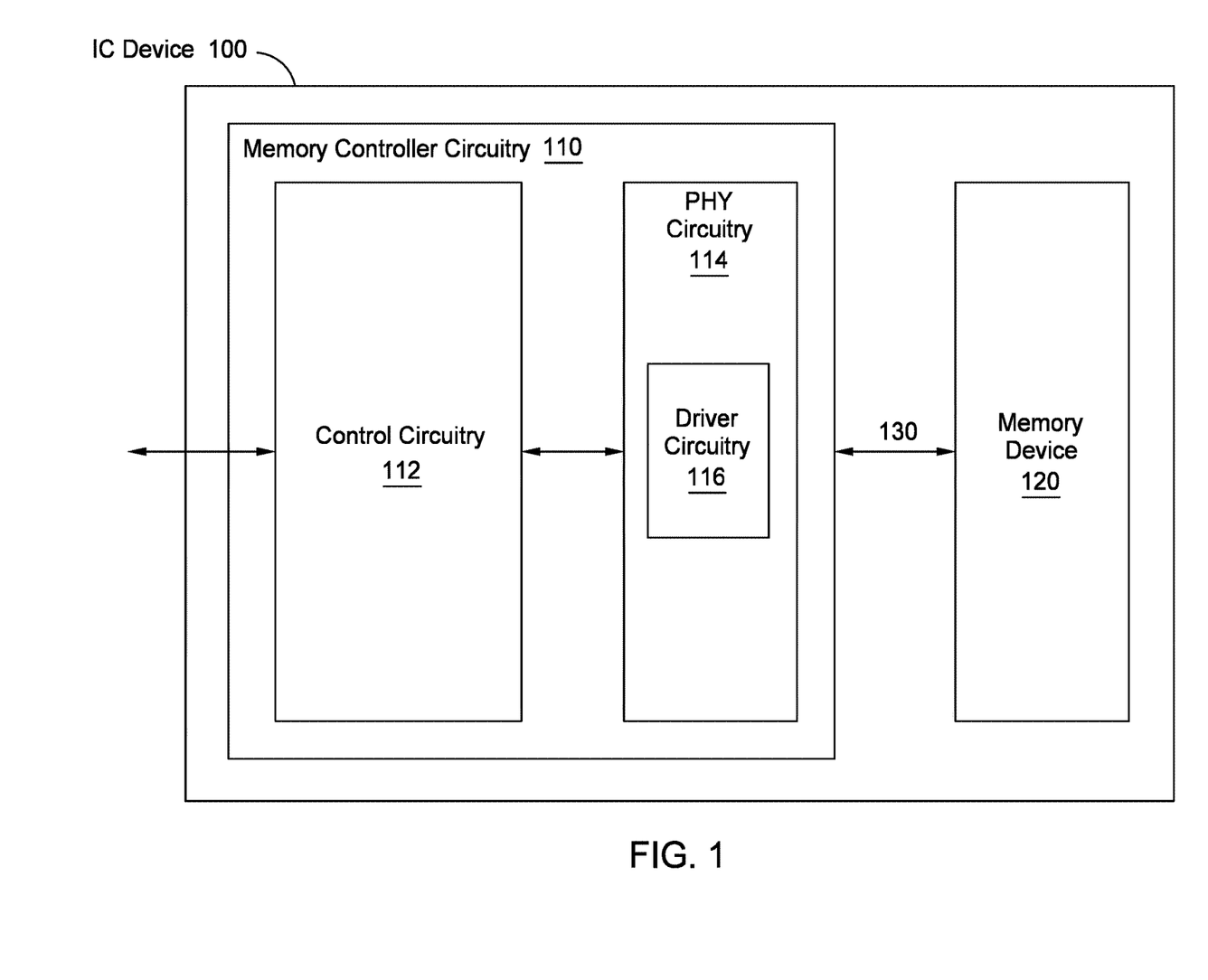
FIG. 1 is a block diagram of an integrated circuit device.

FIG. 1 illustrates a block diagram of an integrated circuit (IC) device 100, according to one or more examples. The IC device 100 includes one or more IC chips. In one example, the IC device 100 includes one or more field programmable gate arrays (FPGAs), and/or one or more application specific ICs (ASICs), among others. In one example, the IC device is a system-on-chip (SoC).

The IC device 100 includes memory controller circuitry 110 and a memory device. The memory controller circuitry 110 is connected to the memory device 120, and drives signals onto and reads signals from the memory device 120. In one example, the memory controller circuitry 110 is an IC chip that is connected to a substrate of the IC device 100. The memory controller circuitry 110 includes programmable circuitry (e.g., a programmable logic region) and/or static circuitry (e.g., a non-programmable logic region).

The memory controller circuitry 110 includes control circuitry 112 and PHY circuitry 114. The control circuitry 112 transmits and receives data signals from a host device connected to the IC device 100.

The control circuitry 112 includes programmable and/or non-programmable circuitry. Programmable circuitry includes circuitry that is programmed via one or more bitstreams to change (e.g., adjust or alter) a function perform by the programmable circuitry. Non-programmable circuitry includes circuitry that is static, e.g., has a function or functions that are unchanged. In one example, the control circuitry 112 receives a signal from an external device, processes the data signal to generate a data signal that is output the memory command to the PHY circuitry 114.

The PHY circuitry 114 is interface circuitry that communicates the data signals to and from the memory device 120. The PHY circuitry 114 is coupled the memory device 120 via channel 130. The channel 130 includes N interconnections (e.g., wires or traces, among others). N is one or more. In one example, N is 16. The PHY circuitry 114 includes driver circuitry 116. The driver circuitry 116 is connected to the memory device 120 via the channel 130. The driver circuitry 116 drives data signals onto the memory device 120.

The memory device 120 is connected to the memory controller circuitry 110 via the channel 130. In one example, the memory device 120 includes one or more input/output (I/O) devices. Further, the memory device 120 includes one or more dynamic random access memories (DRAMs) and/or other types of memories.

In one example, the memory device 120 includes multiple stacked memory chips. For example, the memory device 120 includes multiple stacked DRAMs. The memory chips are stacked to form a three dimensional (3D) stack. The I/O device receives a data signal from the driver circuitry 116 of the PHY circuitry 114, and communicates the data signal to memory elements of the memory device 120. In one example, the I/O device includes receiver circuitry. In one example, the receiver circuitry receives the input signal and a reference signal. In one example, the memory device 120 may be referred to as a high bandwidth memory (HBM) device. In one example, the memory device has an operating frequency of about 10 Gbps, or greater.

Figure 2:
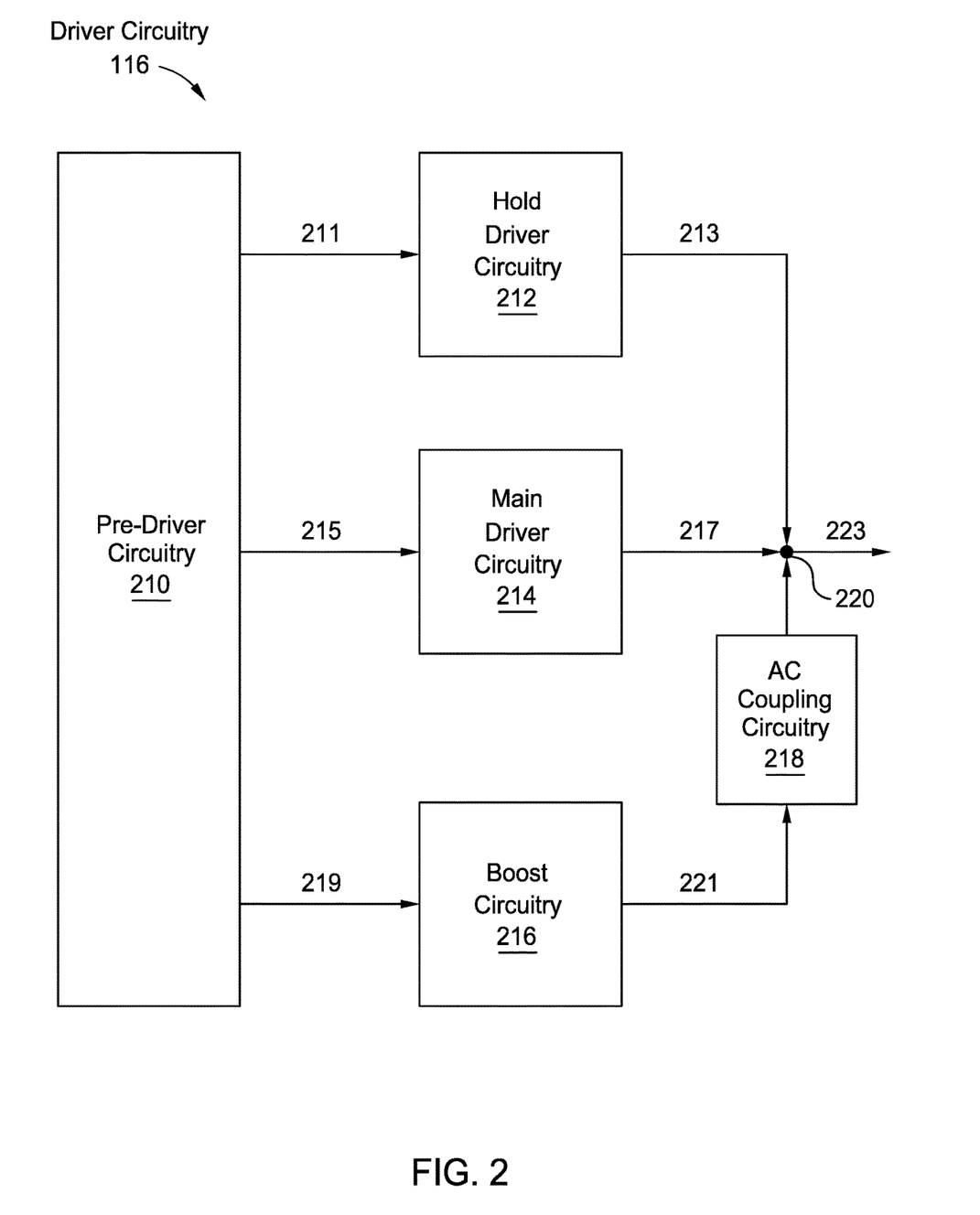
FIG. 2 is a block diagram of driver circuitry.

FIG. 2 illustrates a block diagram of the driver circuitry 116 of FIG. 1. The driver circuitry 116 includes pre-driver circuitry 210, hold driver circuitry 212, main driver circuitry 214, and boost circuitry 216. The outputs of the main driver circuitry 214 and the hold driver circuitry 212 are output to output node 220. The output of the boost circuitry 216 is output to the node 220 via the AC coupling circuitry 218. The AC coupling circuitry 218 allows for a transient response to be coupled to the node 390. For example, the DC response of the signal 371 is de-coupled to the node 390, isolating the current at the node 390. In one or more examples, impedance matching is performed via the main driver circuitry 214. The signal 371 is used when there is a voltage transition on the data_p and data_n signals.

The pre-driver circuitry 210 drives each of the hold driver circuitry 212, main driver circuitry 214, and the boost circuitry 216. As will be described in greater detail in the following, the pre-driver circuitry 210 enables one or more of the hold driver circuitry 212, main driver circuitry 214, and the boost circuitry 216 based on a respective enable signal. In one example, the main driver circuitry 214 and the boost circuitry 216 includes multiple slice circuitries. In such an example, the pre-driver circuitry 210 enables one or more slice circuitries of the main driver circuitry 214 and the boost circuitry 216, varying the strength of each of the main driver circuitry 214 and the boost circuitry 216. The pre-driver circuitry 210 receives an enable signal for each of the main driver circuitry 214 and the boost circuitry 216 and a binary control signal for each of the main driver circuitry 214 and the boost circuitry 216. Based on the enable signal and the binary control signal for the main driver circuitry 214, the pre-driver circuitry 210 enables the main driver circuitry 214, and determines the strength of the main driver circuitry 214. Further, based on the enable signal and the binary control signal for the boost circuitry 216, the pre-driver circuitry 210 enables the boost circuitry 216, and determines the strength of the boost circuitry 216.

The hold driver circuitry 212 receives the control signal 211 and outputs the signal 213. In one example, the signal 213 is an inverted version of the control signal 211. The main driver circuitry 214 receives control signals 215 and outputs the signal 217. The main driver circuitry 214 generates the signal 217 having a varying voltage (e.g., a signal that transitions between a first voltage and a second voltage) based on the control signals 215. For example, based on a first one of the control signals 215 having a positive voltage value and a second one of the control signals 215 having a negative voltage value, the main driver circuitry 214 outputs the signal 217 having a positive voltage value. Further, based on the second one of the control signals 215 having a positive voltage value and the first one of the control signals 215 having a negative voltage value, the main driver circuitry 214 outputs the signal 217 having a negative voltage value.

The boost circuitry 216 receives the control signals 219, and outputs the signal 221. In one example, the signal 221 is a delayed version of the signal 217. In one or more examples, based on a first one of the control signals 219 having a positive voltage value and a second one of the control signals 219 having a negative voltage value, the boost circuitry 216 outputs the signal 221 having a positive voltage value, and being delayed with respect to the signal 217. Further, based on the second one of the control signals 219 having a positive voltage value and the first one of the control signals 219 having a negative voltage value, the boost circuitry 216 outputs the signal 221 having a negative voltage value, and being delayed with respect to the signal 217. In one example, the signal 213 is delayed with respect to the signal 217. The delay of the signal 213 is less than the delay of the signal 221.

The node 220 receives the signal 213, 217, and an AC coupled version of the signal 221. The signal 223 is output from the node 220. In one example, as the signal 221 is delayed with respect to the signal 217, the signal 221 reduces the rise time of the signal 223 output from the node 220, increasing the eye opening of the corresponding eye diagram of an associated data signal and receiver circuitry of the memory device 120 of FIG. 1. Further, the signal 213 holds the value of the signal 223 at a high voltage value, reducing power supply interference and interference due to crosstalk within the corresponding channel (e.g., the channel 130 of FIG. 1). In one example, the signal 223 is output from the driver circuitry 116 to the memory device 120 of FIG. 1. The node 220 may correspond to an input and/or output pad of the PHY circuitry 114 of FIG. 1.

Figure 3:
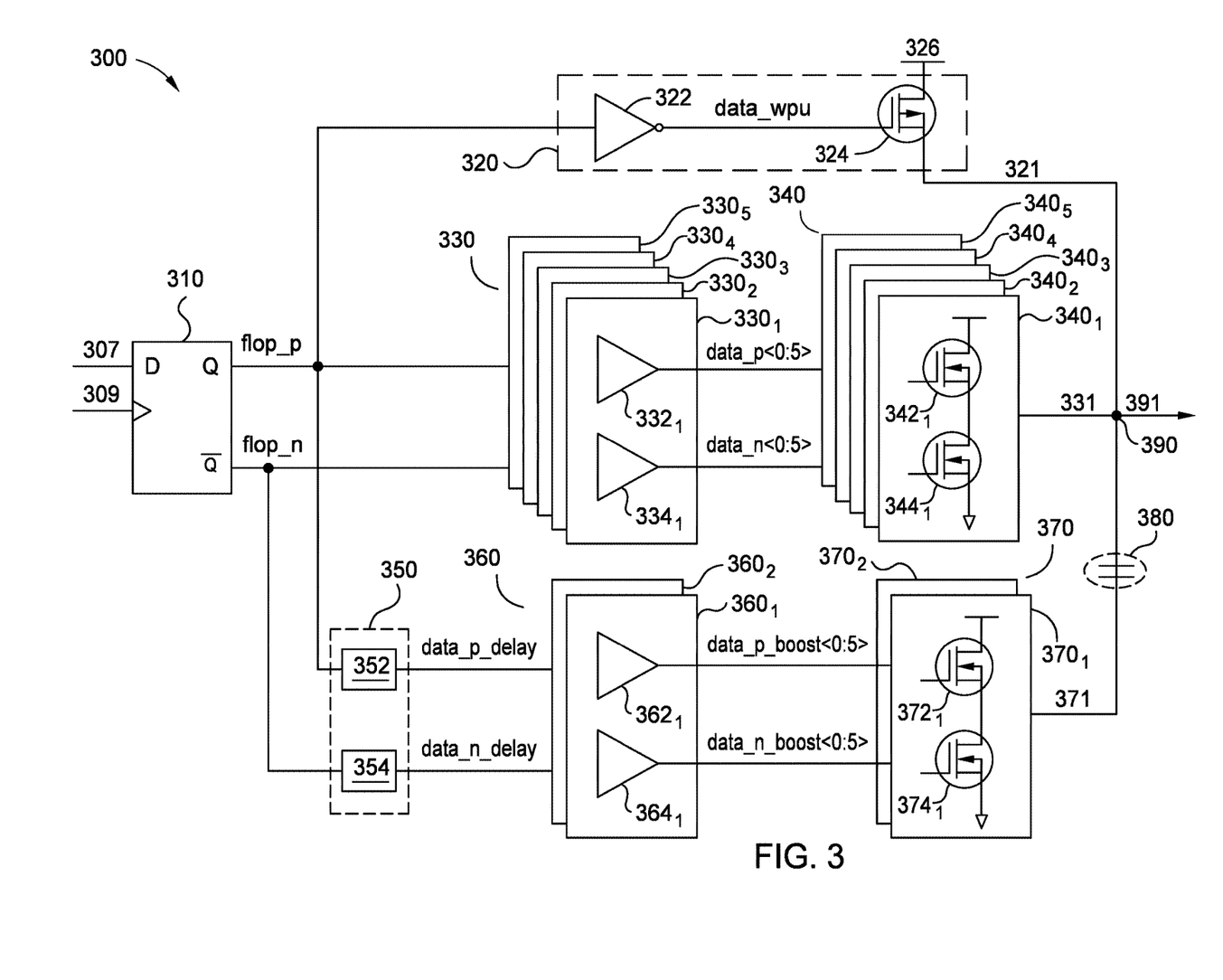
FIG. 3 is a block diagram of driver circuitry.

FIG. 3 illustrates a block diagram of driver circuitry 300, according to one or more examples. The driver circuitry 300 may be used as the driver circuitry 116 of FIG. 1. The driver circuitry 300 includes flip-flop 310, hold driver circuitry 320, pre-driver circuitry 330, main driver circuitry 340, delay circuitry 350, pre-driver boost circuitry 360, boost driver circuitry 370, and capacitor 380. In one example, one or more of the flip-flop 310, the pre-driver circuitry 330, the delay circuitry 350, and the pre-driver boost circuitry 360 are included within the pre-driver circuitry 210 of FIG. 2.

The output of the driver circuitry 300 is connected to the node 390. In one example, the node 390 corresponds to an input and/or output pad of the corresponding memory controller circuitry 110. The signal at the node 390 corresponds to the signals output by the hold driver circuitry 320, main driver circuitry 340, and the boost driver circuitry 370.

In one example, the flip-flop 310 receives the data signal 307, and the clock signal 309, and outputs the signals flop_p and flop_n based on the data signal 307 and the clock signal 309. In one example, the flop_n signal is the inverse of the flop_p signal.

The pre-driver circuitry 330 receives the flop_p and flop_n signals and outputs data_p<0:5> and data_n<0:5> signals. The data_p<0:5> and data_n<0:5> signals include multiple bits (e.g., are multi-bit signals). The data_p<0:5> signals and the data_n<0:5> signals are output to the circuitries of the main driver circuitry 340, and are configured to activate or deactivate leg slice circuities and/or transistors of each driver slice circuitry $340_1$-$340_5$.

In one example, the pre-driver circuitry 330 includes multiple pre-driver slice circuitries $330_1$-$330_5$. Each of the pre-driver slice circuitries $330_1$-$330_5$ receives the signals flop_p and flop_n, and outputs a corresponding data_p<0:5> signal and data_n<0:5> signal.

Each pre-driver slice circuitry $330_1$-$330_5$ is coupled to a corresponding driver slice circuitry $340_1$-$340_5$ of the main driver circuitry 340. FIG. 3 illustrates a simplified depiction of the pre-driver slice circuitries $330_1$-$330_5$ in that each pre-driver slice circuitry $330_1$-$330_5$ includes two inverter circuitries 332 and 334. The inverter circuitry 332 receives the flop_p signal and outputs a respective bit or bits of the data_p signal, and the inverter circuitry 334 receives the flop_n signal and outputs a respective bit or bits of the data_n signal. The pre-driver slice circuitries $330_1$-$330_5$ independently activate and deactivate the driver slice circuitries $340_1$-$340_5$. In one example, the pre-driver slice circuitries $330_1$-$330_5$ independently activate and deactivate the transistors of the driver slice circuitries $340_1$-$340_6$. The pre-driver slice circuitries $330_1$-$330_5$ are described in greater detail with regard to FIGS. 5 and 6.

The main driver circuitry 340 is connected to the output of the pre-driver circuitry 330. The main driver circuitry 340 receives the data_p and data_n signals from the pre-driver circuitry 330, and outputs the signal 331. In one example, the main driver circuitry 340 includes driver slice circuitries $340_1$-$340_6$. Each driver slice circuitry $340_1$-$340_5$ receives the data_p<0:5> and data_n<0:5> signals.

Each driver slice circuitry $340_1$-$340_5$ includes multiple slice leg circuitries. FIG. 3 illustrates a simplified depiction of the slice leg circuitries in that each leg circuitry includes a first and second transistor 342 and 344. The first and second transistors 342 and 344 are n-channel metal-oxide semiconductor (NMOS) transistors. In one example, the gate of the transistor 342 receives the data_p signal and the gate of the transistor 344 receives the data_n signal.

In one example, each pre-driver slice circuitry $330_1$-$330_5$ outputs a data_p<0:5> signal and a data_n<0:5> signal to a respective one of the driver slice circuitries $340_1$-$340_5$. As is discussed with greater detail with regard to FIGS. 5-7, the data_p<0:5> signals and data_n<0:5> signals control the number of activated leg circuitries and transistors within each driver slice circuitries $340_1$-$340_5$ and whether or not a particular driver slice circuitry $340_1$-$340_5$ is enabled. In one example, the data_p<0:5> signals and data_n<0:5> signals control whether or not the transistors 342 a 344 are activated.

In one example, each driver slice circuitry $340_1$-$340_5$ is up to a 3 mA driver unit. In other examples, each driver slice circuitry $340_1$-$340_5$ is driver unit that is less than or larger than 3 mA. As illustrated by the waveforms 400 of FIG. 4, when the data_p signal has a positive value, the data_n signal has a negative value, and when the data_p signal has a negative value, the data_n signal has a positive value. The data_p signal having a positive value, and the data_n signal having a negative value turns on the transistor 342 and turns off the transistor 344. Accordingly, the signal 331 has a positive voltage value. Further, the data_p signal having a negative value, and the data_n signal having a positive value turns off the transistor 342 and turns on the transistor 344. Accordingly, the signal 331 has a negative voltage value. Based on the data_p signal transitioning to a negative voltage value, and the data_n signal transitioning to a positive negative value, the signal 331 transitions from a positive voltage value to a negative voltage value. Further, based on the data_p signal transitioning to a positive voltage value, and the data_n signal transitioning to a negative value, the signal 331 transitions from a negative voltage value to a positive voltage value.

As the first data signal rises in voltage, the second data signal falls in voltage.

While the pre-driver circuitry 330 is described and illustrated as included 5 pre-driver slice circuitries $330_1$-$330_5$, and the main driver circuitry 340 is described and illustrated as included five driver slice circuitries $340_1$-$340_5$, the pre-driver circuitry 330 may include more than or less than five pre-driver slice circuitries, and the main driver circuitry 340 may include more than or less than five driver slice circuitries. In one example, the number of pre-driver slice circuitries is at least as large as the number of driver slice circuitries.

In one example, the voltage value at the node 390 rises, the Vgs of the transistor 342 decreases, increasing the rise time of the voltage value at the node 390. Further, as the voltage value at the node 390 increases (e.g., continues to rise), the transistor 342 reaches a sub-threshold voltage, further slowing down the rise time of the voltage value at node 390.

In one example, to mitigate the increasing rise time of voltage value at the node 390, the boost driver circuitry 370 generates the signal 371 which is AC coupled via the capacitor 380 to the node 390. The signal 371 decreases the rise time of the voltage value at the node 390.

The delay circuitry 350 includes delay circuitry 352 and delay circuitry 354. The delay circuitry 352 receives the flop_p signal and the delay circuitry 354 receives the flop_n signal. In one example, the delay circuitry 352 and the delay circuitry 354 apply a delay in a range of about 2 ps to about 30 ps. In one or more examples, the delay may be programmable set based on a control signal. Further, the delay may be less than about 2 ps or greater than about 30 ps. The delay circuitry 352 generates and outputs the signal data_p_delay based on a corresponding delay and the flop_p signal. The delay circuitry 354 generates and the outputs the signal data_n_delay based on a corresponding delay and the flop_n signal.

The pre-driver boost circuitry 360 receives the data_p_delay signal and the data_n_delay signal and generates the data_p_boost<0:5> signals and the data_n_boost<0:5> signals. The data_p_boost<0:5> signals and the data_n_boost<0:5> signals are multiple bit signals.

The pre-driver boost circuitry 360 includes two pre-driver boost slice circuitries $360_1$ and $360_2$. Each of the pre-driver boost slice circuitries $360_1$ and $360_2$ generates a respective the data_p_boost<0:5> signal and a respective the data_n_boost<0:5> signal. In the simplified depiction of FIG. 3, each of the pre-driver boost slice circuitries $360_1$ and $360_2$ includes an inverter 362 and an inverter 364. The inverter 362 receives the data_p_delay signal and generates and outputs a respective data_p_boost signal<0:5>. The inverter 364 receives the data_n_delay signal and generates and outputs a respective data_n_boost<0:5> signal. In one example, each pre-driver boost slice circuitry $360_1$ and $360_2$ is configured similar as described with regard to the pre-driver circuitry 500 and 600 of FIGS. 5 and 6.

The boost driver circuitry 370 is connected to the output of the pre-driver boost circuitry 360. The boost driver circuitry 370 receives the data_p_boost<0:5> and data_n_boost<0:5> signals from the pre-driver boost circuitry 360, and outputs the signal 371. In one example, the boost driver circuitry 370 includes boost slice circuitries $370_1$-$370_2$. Each of the boost slice circuitries $370_1$-$370_2$ receives a respective data_p_boost<0:5> signal and a respective data_n_boost<0:5> signal.

Each boost slice circuitry $370_1$-$370_2$ includes multiple slice leg circuitries. In the simplified depiction of FIG. 3, each slice leg circuitry includes a first and second transistor 372 and 374. The first and second transistors 372 and 374 are NMOS transistors.

In one example, each boost slice circuitry $370_1$-$370_2$ is up to a 3 mA driver unit. In other examples, each boost slice circuitry $370_1$-$370_2$ is driver unit that is less than or larger than 3 mA.

In one example, each pre-driver boost slice circuitry $360_1$-$360_2$ outputs a data_p_boost<0:5> signal and a data_n_boost<0:5> signal to a respective one of the boost slice circuitries $370_1$-$370_2$. The data_p_boost<0:5> signal and a data_n_boost<0:5> function similar to that of the data_p<0:5> signals and data_n<0:5> signals of FIGS. 5-7 to control the number of activated leg slice circuitries within each boost slice circuitries $370_1$-$370_2$ and whether or not a particular boost slice circuitry $370_1$-$370_2$ is enabled. In one example, the data_p_boost<0:5> signals and data_n_boost<0:5> signals control whether or not the transistors 372 a 374 are activated. Varying the number of activated leg circuitries and/or transistors, varies the strength of the driver boost circuitry 370 as is described with regard to FIG. 7.

Figure 4:
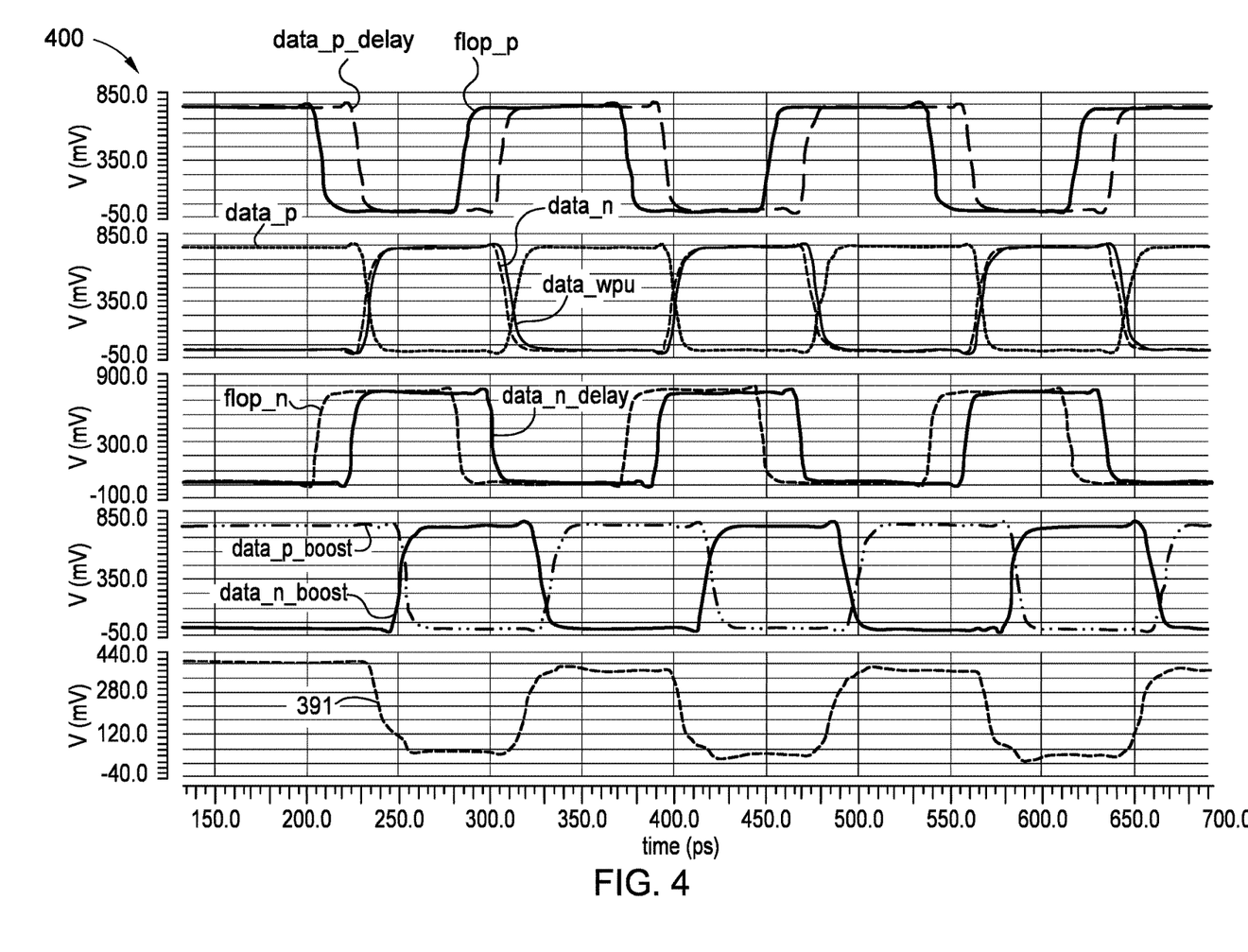
FIG. 4 illustrates waveforms of signals within the driver circuitry of FIG. 3.

As is illustrated by the waveforms 400 of FIG. 4, when the data_p_delay and the data_n_delay signals are similar in shape to the data_p signal and the data_n signal, with the inclusion of a delay. In one example, when the data_p_delay signal has a positive value, the data_n_delay signal has a negative value, and when the data_p_delay signal has a negative value, the data_n_delay signal has a positive value. The data_p_delay signal having a positive value, and the data_n_delay signal having a negative value turns on the transistor 372 and turns off the transistor 374. Accordingly, the signal 371 has a positive voltage value. Further, the data_p_delay signal having a negative value, and the data_n_ delay signal having a positive value turns off the transistor 372 and turns on the transistor 374. Accordingly, the signal 371 has a negative voltage value. Based on the data_p_delay signal transitioning to a negative voltage value and the data_n_delay signal transitioning to a positive negative value, the signal 371 transitions from a positive voltage value to a negative voltage value. Further, based on the data_p_delay signal transitioning to a positive voltage value, and the data_n_delay signal transitioning to a negative value, the signal 371 transitions from a negative voltage value to a positive voltage value.

The signal 371 is similar is shape to the signal 331, and is delayed with reference to the signal 331. Accordingly, the AC coupled signal 371 decreases the rise time of the signal at the node 390, increasing the size of the eye of the corresponding eye diagram, and reducing interference within the output signal 391.

While the pre-driver boost circuitry 360 is described and illustrated as included two pre-driver boost slice circuitries $360_1$-$360_2$, and the boost driver circuitry 370 is described and illustrated as including two boost slice circuitries $370_1$-$370_2$, the pre-driver boost circuitry 360 may include more than or less than two pre-driver boost slice circuitries, and the boost driver circuitry 370 may include more than or less than 2 boost slice circuitries. In one example, the number of pre-driver boost slice circuitries is at least as large as the number of boost slice circuitries.

In one example, the transistors 342 weaken (e.g., the output current is reduced) as the voltage value of the node 390 increases and the transistors 342 are placed in a sub-threshold range. Accordingly, the output signal 391 is susceptible to crosstalk with other signals driven within the channel (e.g., the channel 130 of FIG. 1). In one example, the hold driver circuitry 320 mitigates crosstalk and other interference on the output signal 391.

The hold driver circuitry 320 includes inverter circuitry 322 and transistor 324. The transistor 324 is a p-channel MOS (PMOS) transistor. The inverter circuitry 322 receives the flop_p signal, and inverts the flop_p signal to generate the data_wpu signal. The data_wpu signal is received at the gate of the transistor. The transistor has a source connected to the voltage node 326, and a drain connected to the node 390. The transistor 324 outputs the signal 321 based on the data_wpu signal. In one example, the signal 321 holds the output high strongly, as transistor 342 is in sub-threshold, mitigating crosstalk and other interference on the output signal 391. The signal data_wpu and the signal 321 are delayed with reference to the signal 331. In one example, the signal data_wpu and the signal 321 are delayed by at least about 2 ps. In other examples, the delay is less than or greater than 2 ps.

FIG. 4 illustrates the waveforms 400 of the signals flop_p, flop_n, data_p, data_n, data_wpu, data_p_delay, data_n_delay, data_p_boost, data_n_boost, and signal 391. As shown the waveform 400, the data_p_delay signal is a delayed version of the flop_p signal. The flop_p signal and the data_p_signal have substantially the same shape and amplitude. Further, the data_p signal has the inverse polarity of the data_n signal, and the data_wpu signal is a delayed version of the data_n signal. The data_n signal and the data_wpu signal have substantially the same shape and amplitude. The data_n_delay signal is a delayed version of the flop_n signal. The flop_n signal and the data_n_signal have substantially the same shape and amplitude. The data_p_boost signal has the inverse polarity of the data_n_boost signal. The data_p_boost signal is a delayed version of the data_p signal, and the data_p_boost has substantially the same shape and amplitude as the data_p signal. The data_n_boost signal is a delayed version of the data_n signal, and the data_n_boost has substantially the same shape and amplitude as the data_n signal. Further, as can be seen from the waveforms 400, the signal 391 has a positive voltage value based on the data_p signal having a positive voltage value and the data_n signal having a negative value, and a negative value based on the data_p signal having a negative voltage value and the data_n signal having a positive value. The signal 391 transitions from a positive voltage value to a negative voltage value based on the data_p signal transitioning from a positive voltage value to a negative voltage value and the signal data_n transitioning from a negative voltage value to a positive voltage value. The signal 391 transitions from a negative voltage value to a positive voltage value based on the data_n signal transitioning from a positive voltage value to a negative voltage value and the signal data_p transitioning from a negative voltage value to a positive voltage value.

Figure 5:
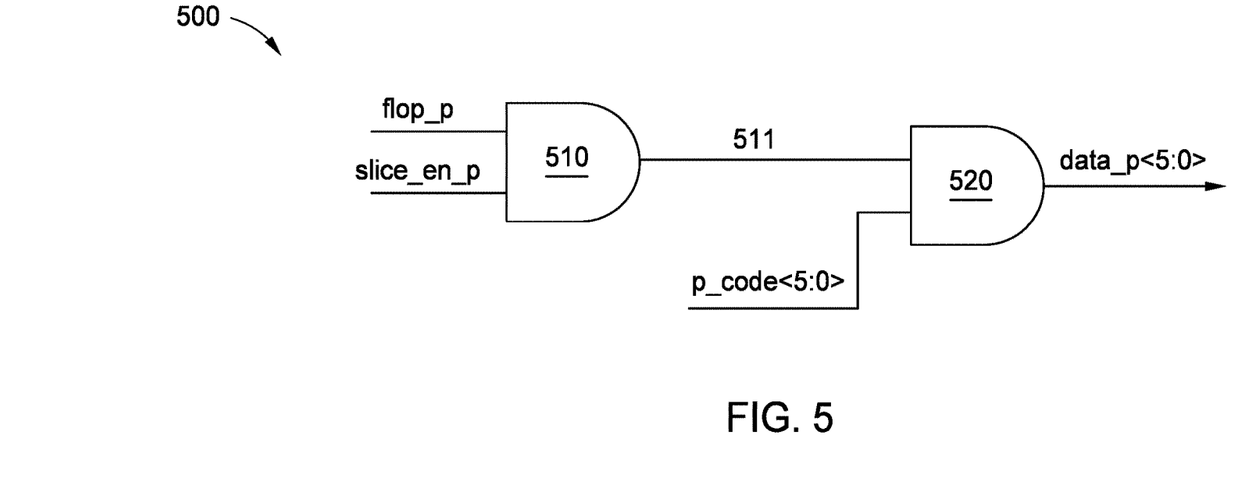
FIG. 5 is a block diagram of pre-driver circuitry for driver circuitry.

FIG. 5 illustrates block diagram of pre-driver circuitry 500 for controlling the number of activated leg slice circuitries and/or transistors 342 of the driver slice circuitries $340_1$-$340_5$ of the main driver circuitry 340. Further, the pre-driver circuitry may be used to control the number of activated leg slice circuitries and transistors 372 of the boost slice circuitries $370_1$-$370_2$. In one example, the pre-driver circuitry 500 is included within the pre-driver circuitry 330 of FIG. 3 and/or the pre-driver boost circuitry 360 of FIG. 3. The pre-driver circuitry 500 includes AND logic circuitry 510 and AND logic circuitry 520. The AND logic circuitry 510 receives the flop_p signal and the slice_en_p signal and outputs the signal 511. The slice_en_p signal is an enable signal. The AND logic circuitry 510 outputs the signal 511 having a logic value of 1 based on the flop_p signal and the slice_en_p signal each having a logic value of 1. The AND logic circuitry 510 outputs the signal 511 having a logic value of 0 based on either of the flop_p signal and the slice_en_p signal having a logic value of 0. The AND logic circuitry 520 receives the signal 511 and a bit of the p_code<5:0> signal, and outputs the signal data_p<5:0> based on the signal 511 and bit of the p_code<5:0> signal. The p_code<5:0> signal includes multiple bits, one bit for each leg slice circuitry of the corresponding driver slice circuitry $340_1$-$340_5$. In one example, the p_code<5:0> further includes a bit for each leg slice circuitry of the corresponding boost slice circuitry $370_1$-$370_2$. With reference to FIG. 3, the p_code<5:0> signal activates or deactivates the transistors 342 of the corresponding leg slice circuitry of the corresponding driver slice circuitry $340_1$-$340_5$. In one example, the p_code<5:0> signal further activates or deactivates the transistors 372 of the corresponding leg slice circuitry of the corresponding boost slice circuitries $370_1$-$370_2$. In one example, data_p<5:0> signal includes multiple bits. With reference to FIG. 3, each bit of the data_p<5:0> signal is associated with a transistor 342 of the corresponding leg slice circuitry of the corresponding of the driver slice circuitries $340_1$-$340_5$.

A bit of the data_p<5:0> signal has a logic value of 1 based on the signal 511 having a logic value of 1, and a corresponding bit of the p_code<5:0> signal having a logic value of 1. A bit of the data_p<5:0> signal has a logic value of 0 based on either of the signal 511 and a corresponding bit of the p_code<5:0> signal having a logic value of 0.

Figure 6:
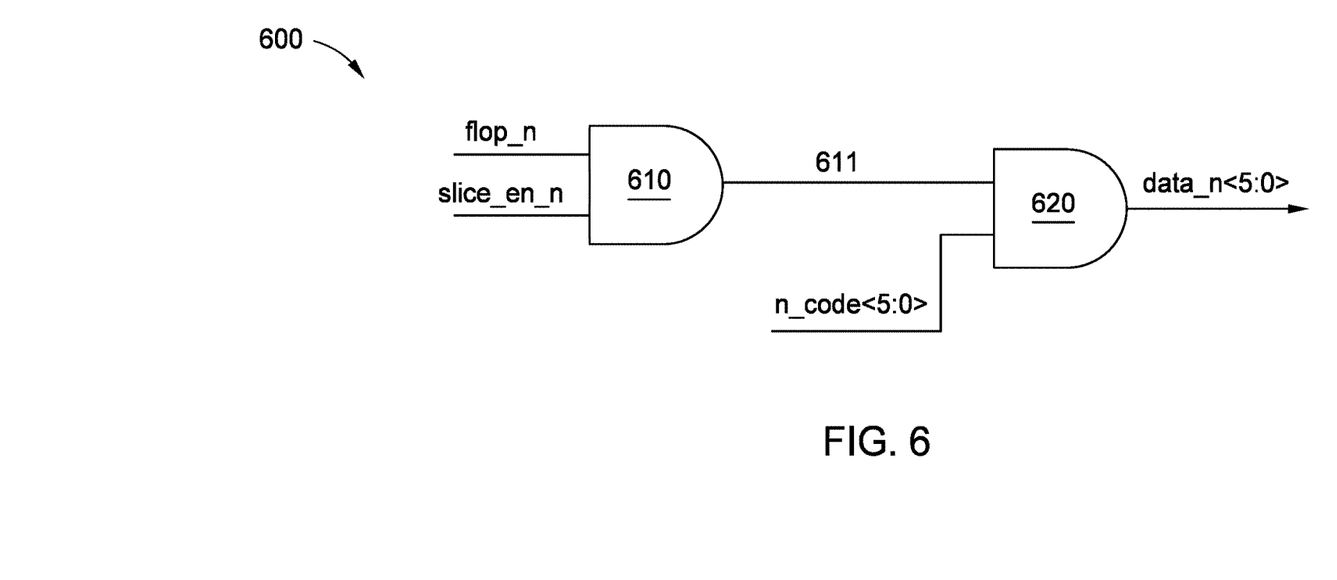
FIG. 6 is a block diagram of pre-driver circuitry for driver circuitry.

FIG. 6 illustrates block diagram of pre-driver circuitry 600 for controlling the number of leg slice circuitries and/or activated transistors 344 of the driver slice circuitries $340_1$-$340_5$ of the main driver circuitry 340 and/or the number of activated leg slice circuitries and/or transistors 374 of the boost slice circuitries $370_1$-$370_2$. In one example, the pre-driver circuitry 600 is included within the pre-driver circuitry 330 of FIG. 3 and/or the pre-driver boost circuitry 360 of FIG. 3. The pre-driver circuitry 600 includes AND logic circuitry 610 and AND logic circuitry 620. The AND logic circuitry 610 receives the flop_n signal and the slice_en_n signal and outputs the signal 611. The slice_en_n signal is an enable signal. The AND logic circuitry 610 outputs the signal 611 having a logic value of 1 based on the flop_n signal and the slice_en_n signal each having a logic value of 1. The AND logic circuitry 610 outputs the signal 611 having a logic value of 0 based on either of the flop_n signal and the slice_en_n signal having a logic value of 0. The AND logic circuitry 620 receives the signal 611 and a bit of the n_code<5:0> signal, and outputs the signal data_n<5:0> based on the signal 611 and the bit of the n_code<5:0> signal. The bit of the n_code<5:0> signal includes multiple bits, one bit for each driver slice circuitry. In one example, the n_code<5:0> signal further includes a bit for each leg slice circuitry of a boost slice circuitry. With reference to FIG. 3, the bits of the n_code<5:0> signal activates or deactivates the transistors 344 of the leg slice circuitries of each driver slice circuitry $340_1$-$340_5$. In one example, the n_code<5:0> signal further activates or deactivates the transistors 374 of the leg slice circuitries of each of the boost slice circuitries $370_1$-$370_2$. In one example, data_n<5:0> signal includes multiple bits. Each bit of the data_n<5:0> signal is associated with a transistor 344 of each of the leg slice circuitries of the driver slice circuitries $340_1$-$340_5$. A bit of the data_n<5:0> has a logic value of 1 based on the signal 611 having a logic value of 1, and a corresponding bit of the n_code<5:0> signal having a logic value of 1. Further, a bit of the data_n<5:0> has a logic value of 0 based on the signal 611 having a logic value of 0, and a corresponding bit of the n_code<5:0> signal having a logic value of 0.

In one example with reference to FIG. 3, the main driver circuitry 340 includes five driver slice circuitries, the driver slice circuitries $340_1$-$340_5$, and the boost driver circuitry 370 includes two boost slice circuitries, the boost slice circuitries $370_1$-$370_2$. In such an example, the pre-driver circuitry 500 and 600 of FIGS. 5 and 6 may be used control which of the driver slice circuitries and boost driver circuitries are active. For example, the slice_en_p<6:0> signal has seven bits, one for each transistor 342 of the leg slice circuitries of the driver slice circuities $340_1$-$340_5$ and each transistor 372 of the boost slice circuitries $370_1$-$370_2$. Accordingly, each of the transistors 342 and 372 can be independently activated and deactivated. Further, the slice_en_n<6:0> signal has seven bits, one for each transistor 344 of each of the leg slice circuitries of the driver slice circuities $340_1$-$340_5$ and each transistor 374 of each of the leg slice circuitries of the boost slice circuitries $370_1$-$370_2$. Accordingly, each of the transistors 344 and 374 of each leg slice circuitry can be independently activated and deactivated. In one example, the slice_en_n<6:0> signal and the slice_en_n<6:0> signal indicate five transistors 342 are activated, four transistors 344 are activated, two transistors 372 are activated, and one transistor 374 is activated. In such an example, the pull up is stronger than the pull down. Varying the combination of transistors 342, 344, 372, and 374 that are activated and deactivated varies the amplitude, shape, rise time and/or fall time of the signal 391, varying the eye opening within the corresponding eye diagram.

Figure 7:
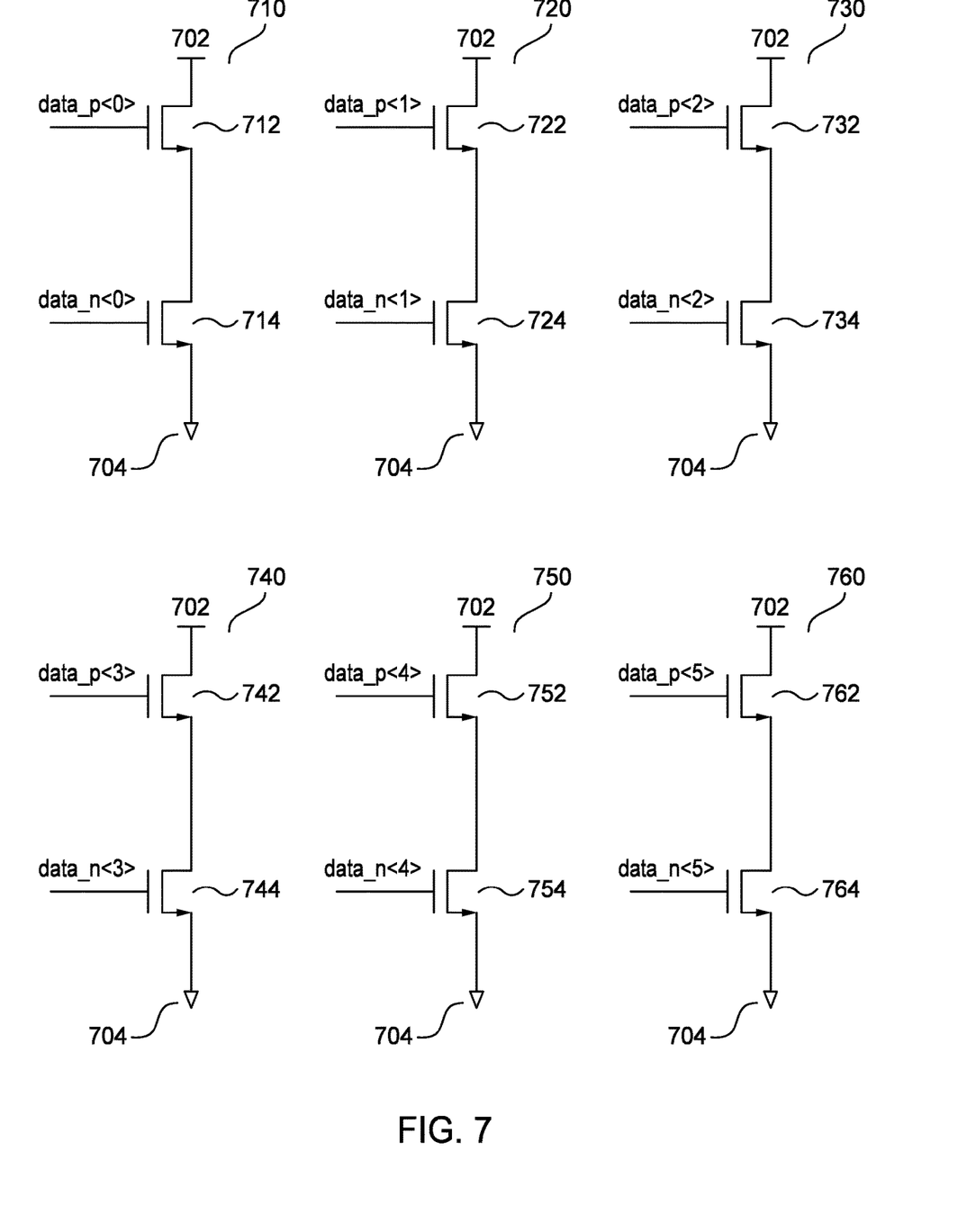
FIG. 7 illustrates example leg slice circuitries.

FIG. 7 illustrates leg slice circuitries 710, 720, 730, 740, 750, and 760, Each leg slice circuitry 710, 720, 730, 740, 740, 750, and 760 is connected between a voltage node 702 that receives a first voltage signal and a reference voltage node 704 that receives a reference voltage. The voltage level of the first voltage node is greater than that of the reference voltage. In one example, the leg slice circuitries 710, 720, 730, 740, 750, and 760 are leg slice circuitries of driver slice circuitries (e.g., the driver slice circuitries $340_1$-$340_5$ of FIG. 3) and/or boost slice circuitries (e.g., the boost slice circuitries $370_1$-$370_2$ of FIG. 3). In one example, the driver slice circuitries and/or more boost driver circuities may include more than or less than six leg slice circuitries as depicted in FIG. 7. Each of the leg slice circuitries 710-760 receives a different bit of the data_p signal and a different bit of the data_n signal. The gate of the transistor 712 of the leg slice circuitry 710 receives the data_p<0> signal and the gate of the transistor 714 of the leg slice circuitry 710 receives the data_n<0> signal. The gate of the transistor 722 of the leg slice circuitry 720 receives the data_p<1> signal and the gate of the transistor 724 of the leg slice circuitry 720 receives the data_n<1> signal. The gate of the transistor 732 of the leg slice circuitry 730 receives the data_p<2> signal and the gate of the transistor 734 of the leg slice circuitry 730 receives the data_n<2> signal. The gate of the transistor 742 of the leg slice circuitry 740 receives the data_p<3> signal and the gate of the transistor 744 of the leg slice circuitry 740 receives the data_n<3> signal. The gate of the transistor 752 of the leg slice circuitry 750 receives the data_p<4> signal and the gate of the transistor 754 of the leg slice circuitry 750 receives the data_n<4> signal. The gate of the transistor 762 of the leg slice circuitry 760 receives the data_p<5> signal and the gate of the transistor 764 of the leg slice circuitry 760 receives the data_n<5> signal. In one example, the transistors 712, 714, 722, 724, 732, 734, 742, 744, 752, 754, 762, and 764 are NMOS transistors, and are connected in series within each leg slice circuitry 710-760. With reference to FIG. 3, in one example, the transistors 712, 722, 732, 742, 752, and 762 correspond to the transistors 342, and the transistors 714, 724, 734, 744, 754, and 764 correspond to the transistor 344. Further, in one example, the transistors 712, 722, 732, 742, 752, and 762 correspond to the transistors 372, and the transistors 714, 724, 734, 744, 754, and 764 correspond to the transistor 374.

In one example, setting a bit of the data_p signal to a logic value of zero deactivates the corresponding transistor (e.g., transistor 712, 722, 732, 742, 752 and/or 762), and setting a bit of the data_p signal to a logic value of one activates the corresponding transistor (e.g., transistor 712, 722, 732, 742, 752 and/or 762). Setting a bit of the data_n signal to a logic value of zero deactivates the corresponding transistor (e.g., transistor 714, 724, 734, 744, 754 and/or 764), and setting a bit of the data_n signal to a logic value of one activates the corresponding transistor (e.g., transistor 742, 742, 742, 742, 742 and/or 742). Each of the transistors 712, 714, 722, 724, 732, 734, 742, 744, 752, 754, 762, and 764 is independently controllable by the corresponding data_p and data_n signal. In one example, increasing the number of slice circuitries 710-760 that is activated, increases the strength of the correspond driver circuitry and/or boost circuitry. For example, activating the leg slice circuitry 710 corresponds to a strength of 0.5×, activating the leg slice circuitry 720 corresponds to a strength of 1×, activating the leg slice circuitry 730 corresponds to a strength of 2×, activating the leg slice circuitry 740 corresponds to a strength of 4×, activating the leg slice circuitry 750 corresponds to a strength of 8×, and activating the leg slice circuitry 760 corresponds to a strength of 16×. Accordingly, by activating different combinations of the leg slice circuitries 710, 720, 730, 740, 750, and 760, strengths between 0.5× and 31.5× in steps of 0.5× can be achieved.

With further reference to FIG. 3, in one example, the delay circuitry 352 and delay circuitry 354 and pre-driver boost circuitry 360, and the boost driver circuitry 370 are omitted. In such an example, a first flip-flop receives the flop_p signal and generates the data_p_delay signal and a second flip-flop receives the flop_n signal and generates the data_n_delay signal. The data_p_delay signal may be referred to as data_p_postcusor signal and the data_n_delay signal may be referred as a data_n_postcursor signal. With reference to FIGS. 5 and 6, the data_p_postcursor signal is used as the slice_en_p signal and the data_n_postcursor signal is used as the slice_en_n signal of one or more slice circuitries. For example, the data_p_postcursor signal is used as the slice_en_p signal and the data_n_postcursor signal is used as the slice_en_n signal of two driver slice circuitries $340_1$-$340_5$. Using the data_p_postcursor signal and the data_n_postcursor signal as the slice_en_p signal and the slice_en_n signal ensures that one or more slice circuitries is activated when the flop_p and flop_n signal transitions between voltage values, dynamically control the drive strength of the main driver circuitry 340. Accordingly, the slew rate of the signal 391 is improved.

While the foregoing is directed to specific examples, other and further examples may be devised without departing from the basic scope thereof, and the scope thereof is determined by the claims that follow.

What is claimed is:

1. A driver circuitry comprising:
main driver circuitry connected to an output node, comprising driver slice circuitries, and configured to output a first output signal to the output node based on a first input signal, a second input signal, and a number of activated driver slice circuitries of the driver slice circuitries;
hold driver circuitry connected to the output node, and configured to receive the first input signal and output a second output signal, wherein the second output signal is delayed with reference to the first output signal by a first delay amount;
first delay circuitry configured to receive the first input signal and output a first delayed signal based on a second delay amount; and
second delay circuitry configured to receive the second input signal and output a second delayed signal based on the second delay amount.

2. The driver circuitry of claim 1, wherein the hold driver circuitry comprises inverter circuitry and a hold transistor, wherein the inverter circuitry is configured to receive the first input signal and output an inverted first input signal to a gate node of the hold transistor, and wherein the hold transistor is configured to output the second output signal based on the inverted first input signal.

3. The driver circuitry of claim 1 further comprising:
pre-driver boost circuitry comprising pre-driver boost slice circuitries, the pre-driver boost circuitry configured to receive the first delayed signal and the second delayed signal and output a first delayed boost signal and a second delayed boost signal.

4. The driver circuitry of claim 3 further comprising:
boost circuitry comprising boosts slice circuitries, the boost circuitry configured to output a third output signal based on the first delayed boost signal, the second delayed boost signal, and a number of activated boost slice circuitries of the boosts slice circuitries, wherein the third output signal is delayed with reference to the first output signal; and
a capacitor connected between the output of the boost circuitry and the output node.

5. The driver circuitry of claim 4, wherein each of the boost slice circuitries includes a first transistor and a second transistor, and wherein each of the first transistors and each of the second transistors are configured to be independently activated and deactivated.

6. The driver circuitry of claim 1, wherein the second delay amount is greater than the first delay amount.

7. The driver circuitry of claim 1 further comprising:
pre-driver circuitry comprising pre-driver slice circuitries, the pre-driver circuitry configured to receive the first input signal and the second input signal and output a first data signal and a second data signal,
wherein the main driver circuitry is further configured to receive the first data signal and the second data signal, and generate the first output signal based on the first data signal, the second data signal, and the number of the activated driver slice circuitries.

8. The driver circuitry of claim 7, wherein each of the driver slice circuitries includes a first transistor and a second transistor, and wherein each of the first transistors and each of the second transistors are configured to be independently activated and deactivated.

9. A memory controller comprising:
control circuitry configured to output a data signal; and
interface circuitry coupled to the control circuitry and configured to receive the data signal, the interface circuitry comprising driver circuitry, the driver circuitry comprising:
main driver circuitry connected to an output node, and comprising driver slice circuitries, the main driver circuitry configured to output a first output signal to the output node based on a first input signal, a second input signal, and a number of activated driver slice circuitries of the driver slice circuitries, wherein the first input signal and the second input signal are generated from the data signal; and
hold driver circuitry connected to the output node, and configured to receive the first input signal and output a second output signal, wherein the second output signal is delayed with reference to the first output signal by a first delay amount, wherein the interface circuitry is further configured to output a signal to a memory device based on the first output signal and the second output signal.

10. The memory controller of claim 9, wherein the hold driver circuitry comprises inverter circuitry and a hold transistor, wherein the inverter circuitry is configured to receive the first input signal and output an inverted first input signal to a gate node of the hold transistor, and wherein the hold transistor is configured to output the second output signal based on the inverted first input signal.

11. The memory controller of claim 9, wherein the driver circuitry further comprises:
first delay circuitry configured to receive the first input signal and output a first delayed signal based on a second delay amount; and
second delay circuitry configured to receive the second input signal and output a second delayed signal based on the second delay amount.

12. The memory controller of claim 11, wherein the driver circuitry further comprises:
pre-driver boost circuitry comprising pre-driver boost slice circuitries, the pre-driver boost circuitry configured to receive the first delayed signal and the second delayed signal and output a first delayed boost signal and a second delayed boost signal.

13. The memory controller of claim 12, wherein the driver circuitry further comprises:

boost circuitry comprising boosts slice circuitries, the boost circuitry configured to output a third output signal based on the first delayed boost signal, the second delayed boost signal, and a number of activated boost slice circuitries of the boost slice circuitries, wherein the third output signal is delayed with reference to the first output signal; and a capacitor connected between the output of the boost circuitry and the output node.

14. The memory controller of claim 12, wherein the driver circuitry further comprises:
pre-driver circuitry comprising pre-driver slice circuitries, the pre-driver circuitry configured to receive the first input signal and the second input signal, and output a first data signal and a second data signal,
wherein the main driver circuitry is further configured to receive the first data signal and the second data signal, and generate the first output signal based on the first data signal, the second data signal, and the number of the activated driver slice circuitries.

15. A driver circuitry comprising:
main driver circuitry connected to an output node, and comprising driver slice circuitries, the main driver circuitry configured to output a first output signal to the output node based on a first input signal, a second input signal, and a number of activated driver slice circuitries;
hold driver circuitry connected to the output node, and configured to receive the first input signal and output a second output signal, wherein the second output signal is delayed with reference to the first output signal by a first delay amount;
delay circuitry configured to receive the first input signal and the second input signal and output a first delayed signal and a second delayed signal based on a second delay amount; and
boost circuitry comprising boosts slice circuitries, the boost circuitry configured to output a third output signal based on the first delayed signal, the second delayed signal, and a number of activated boost slice circuitries, wherein the third output signal is delayed with reference to the first output signal.

16. The driver circuitry of claim 15, wherein the hold driver circuitry comprises inverter circuitry and a hold transistor, wherein the inverter circuitry is configured to receive the first input signal and output an inverted first input signal to a gate node of the hold transistor, and wherein the hold transistor is configured to output the third output signal based on the inverted first input signal.

17. The driver circuitry of claim 15 further comprising:
pre-driver boost circuitry comprising pre-driver boost slice circuitries, the pre-driver boost circuitry configured to receive the first delayed signal and the second delayed signal, and output a first delayed boost signal and a second delayed boost signal, wherein the boost circuitry is configured to output the third output signal based on the first delayed boost signal and the second delayed boost signal.

18. The driver circuitry of claim 15, wherein each of the driver slice circuitries includes a first transistor and a second transistor, wherein each of the first transistors and each of the second transistors are configured to be independently activated and deactivated, wherein each of the boost slice circuitries includes a third transistor and a fourth transistor, and wherein each of the third transistors and each of the fourth transistors are configured to be independently activated and deactivated.

19. The driver circuitry of claim 15 further comprising:
pre-driver circuitry comprising pre-driver slice circuitries, the pre-driver circuitry configured to receive the first input signal and the second input signal and output a first data signal and a second data signal, wherein the main driver circuitry is further configured to receive the first data signal and the second data signal, and generate the first output signal based on the first data signal, the second data signal, and the number of the activated driver slice circuitries.

* * * * *